United States Patent
Farina et al.

(10) Patent No.: US 11,230,186 B2
(45) Date of Patent: Jan. 25, 2022

(54) MOTOR VEHICLE TANK SUBASSEMBLY AND WITHDRAWAL MODULE HAVING A POROUS CONVEYING BODY

(71) Applicant: Röchling Automotive SE & Co. KG, Mannheim (DE)

(72) Inventors: Werner Farina, Bolzano (IT); Fabrizio Chini, Isera (IT); Mirco Bragagnolo, Galliera Veneta (IT)

(73) Assignee: Röchling Automotive SE & Co. KG, Mannheim (DE)

( * ) Notice: Subject to any disclaimer, the term of this patent is extended or adjusted under 35 U.S.C. 154(b) by 448 days.

(21) Appl. No.: 16/419,704

(22) Filed: May 22, 2019

(65) Prior Publication Data

US 2019/0366836 A1   Dec. 5, 2019

(30) Foreign Application Priority Data

May 30, 2018   (DE) ...................... 10 2018 208 643.5

(51) Int. Cl.
   *B60K 15/04*   (2006.01)
   *B01D 35/027*   (2006.01)
   *B60K 15/03*   (2006.01)

(52) U.S. Cl.
   CPC ............ *B60K 15/04* (2013.01); *B01D 35/027* (2013.01); *B60K 2015/03236* (2013.01); *B60K 2015/03243* (2013.01); *B60K 2015/03427* (2013.01)

(58) Field of Classification Search
   None
   See application file for complete search history.

(56) References Cited

U.S. PATENT DOCUMENTS

| 4,077,884 A | * | 3/1978 | Naumann | ............ B60K 15/077 |
| | | | | 210/172.3 |
| 4,179,036 A | * | 12/1979 | Pasini | .................. B60K 15/077 |
| | | | | 137/574 |

(Continued)

FOREIGN PATENT DOCUMENTS

| DE | 102014222467 A1 | 5/2016 |
| DE | 102016203056 A1 | 8/2017 |
| DE | 102016205103 A1 | 10/2017 |

OTHER PUBLICATIONS

German Search Report for corresponding DE 10 2018 208 643.5 dated May 3, 2019, 7 pgs.

(Continued)

*Primary Examiner* — Robert J Popovics
(74) *Attorney, Agent, or Firm* — Rankin, Hill & Clark LLP

(57) ABSTRACT

A motor vehicle tank subassembly for storing and discharging an operating liquid, encompassing a tank having a tank volume, a filling opening a withdrawal opening, and a conveying pump having intake and delivery sides, the intake side connected to the withdrawal opening, a material that forms a pore volume being received in the tank; the material that forms a pore volume, constituting a porous conveying body having a body volume, occupies only part of the tank volume, the porous conveying body embodied to receive liquid stored in the tank in its pore volume utilizing a capillary effect; the porous conveying body having a discharge portion connected to the withdrawal opening such that the withdrawal vacuum at the withdrawal opening brings about in pores of the discharge portion a discharge vacuum that overcomes the capillary effect occurring there; the remainder of the porous conveying body extending away from the discharge portion and the withdrawal opening.

20 Claims, 1 Drawing Sheet

(56) References Cited

U.S. PATENT DOCUMENTS

| | | | | |
|---|---|---|---|---|
| 4,391,716 A * | 7/1983 | McCurry | F02M 37/24 | 210/799 |
| 4,759,857 A * | 7/1988 | Acuna | B01D 35/00 | 210/741 |
| 4,844,974 A * | 7/1989 | McCullough, Jr. | C04B 30/02 | 442/349 |
| 5,006,264 A * | 4/1991 | Acuna | B01D 35/00 | 137/140 |
| 5,105,063 A * | 4/1992 | Hockemier | G01F 23/36 | 219/205 |
| 5,398,659 A * | 3/1995 | Zimmerman | F02M 37/106 | 123/514 |
| 5,716,522 A * | 2/1998 | Chilton | B01D 29/111 | 210/317 |
| 5,787,865 A * | 8/1998 | Harris | B01D 35/0273 | 123/516 |
| 5,795,468 A * | 8/1998 | Reising | B01D 29/15 | 210/172.4 |
| 5,899,682 A * | 5/1999 | Henderson | F24C 5/16 | 431/12 |
| 5,902,480 A * | 5/1999 | Chilton | F02M 37/50 | 210/317 |
| 5,967,765 A * | 10/1999 | Henderson | F23D 3/02 | 431/12 |
| 5,979,417 A * | 11/1999 | Hyodo | B60K 15/03 | 123/516 |
| 5,988,213 A * | 11/1999 | Yoshioka | F02M 37/106 | 123/509 |
| 6,241,883 B1 * | 6/2001 | Noda | B01D 35/027 | 210/172.3 |
| 6,283,731 B1 * | 9/2001 | Yoshioka | B01D 35/0273 | 417/423.3 |
| 6,412,475 B1 * | 7/2002 | Joos | F02M 37/0058 | 123/510 |
| 6,464,872 B1 * | 10/2002 | Honda | B01D 35/0273 | 210/416.4 |
| 6,471,072 B1 * | 10/2002 | Rickie | F02M 37/50 | 210/486 |
| 6,951,208 B2 * | 10/2005 | Milton | F02M 37/106 | 123/509 |
| 7,134,568 B2 * | 11/2006 | Moriyama | F02M 37/50 | 220/563 |
| 7,216,607 B2 | 5/2007 | Mezheritsky et al. | | |
| 7,353,810 B1 * | 4/2008 | Blaschke | F02M 31/125 | 123/549 |
| 7,429,322 B2 * | 9/2008 | Fujita | F02M 37/50 | 210/172.4 |
| 7,647,767 B2 * | 1/2010 | Osaku | F01N 3/2066 | 60/286 |
| 7,901,572 B2 * | 3/2011 | Sato | B01D 39/1623 | 210/172.4 |
| 7,964,096 B2 * | 6/2011 | Kimisawa | F02M 37/025 | 210/172.4 |
| 8,132,557 B2 | 3/2012 | Joos et al. | | |
| 8,137,546 B2 * | 3/2012 | Ogose | B01D 39/1623 | 210/172.4 |
| 8,173,013 B2 * | 5/2012 | Sato | F02M 37/50 | 210/172.4 |
| 8,283,612 B2 * | 10/2012 | Keite-Telgenbuescher | H05B 3/34 | 219/548 |
| 8,372,278 B1 * | 2/2013 | Nguyen | B01D 35/0273 | 210/172.2 |
| 8,429,900 B2 * | 4/2013 | Knetsch | F01N 3/206 | 60/286 |
| 8,586,895 B2 * | 11/2013 | Haeberer | F01N 3/2066 | 219/209 |
| 8,625,978 B2 * | 1/2014 | Potier | H05B 3/78 | 392/441 |
| 8,715,497 B2 * | 5/2014 | Schnipke | B01D 35/0273 | 210/172.2 |
| 8,728,308 B2 * | 5/2014 | Schnipke | B01D 35/0273 | 210/172.2 |
| 8,875,493 B2 * | 11/2014 | Chmielewski | F01N 3/00 | 60/286 |
| 8,915,066 B2 * | 12/2014 | Vorsmann | C01C 1/086 | 60/295 |
| 8,915,068 B2 * | 12/2014 | Haeberer | F01N 3/2066 | 60/295 |
| 8,955,308 B2 * | 2/2015 | Bauer | F24H 9/2007 | 60/286 |
| 8,955,311 B2 * | 2/2015 | Brueck | F01N 3/2066 | 60/295 |
| 8,991,158 B2 * | 3/2015 | Brueck | F01N 3/2066 | 60/295 |
| 9,038,374 B2 * | 5/2015 | Bruck | F01N 3/2066 | 60/295 |
| 9,051,864 B2 * | 6/2015 | Leonard | F01N 3/208 | |
| 9,074,510 B2 * | 7/2015 | Bauer | G01F 23/242 | |
| 9,074,610 B2 * | 7/2015 | Harr | F01N 3/2066 | |
| 9,080,485 B2 * | 7/2015 | Hodgson | F01N 3/206 | |
| 9,097,164 B2 * | 8/2015 | Bauer | F01N 3/24 | |
| 9,121,318 B2 * | 9/2015 | Maguin | F01N 3/08 | |
| 9,127,583 B2 * | 9/2015 | Hodgson | F01N 3/2066 | |
| 9,169,760 B2 * | 10/2015 | Maguin | F01N 3/208 | |
| 9,249,709 B2 * | 2/2016 | Hodgson | F01N 3/2066 | |
| 9,376,950 B2 * | 6/2016 | Ogawa | B01D 35/26 | |
| 9,556,768 B2 * | 1/2017 | Burger | F01N 3/00 | |
| 9,803,530 B2 * | 10/2017 | Treudt | F01N 3/2013 | |
| 9,816,470 B2 * | 11/2017 | Nishio | F02M 37/10 | |
| 10,016,710 B2 * | 7/2018 | Treudt | B01D 35/18 | |
| 10,018,090 B2 * | 7/2018 | Maguin | F01N 3/2066 | |
| 10,023,048 B2 * | 7/2018 | Ganthaler | B60K 15/03177 | |
| 10,024,283 B2 * | 7/2018 | Ishitoya | B01D 35/0273 | |
| 10,024,284 B2 * | 7/2018 | Tanahashi | F02M 37/32 | |
| 10,029,561 B2 * | 7/2018 | Tipton | B60K 15/077 | |
| 10,029,922 B2 * | 7/2018 | Segroves | B01D 21/0042 | |
| 10,086,695 B2 * | 10/2018 | Ganthaler | B60K 15/03177 | |
| 10,113,461 B2 * | 10/2018 | Daragon | F01N 3/2066 | |
| 10,145,341 B2 * | 12/2018 | Kim | F02M 37/14 | |
| 10,145,722 B2 * | 12/2018 | Bauer | G01F 23/2962 | |
| 10,190,554 B2 * | 1/2019 | Ishimitsu | B01D 61/362 | |
| 10,240,595 B2 * | 3/2019 | Brueck | F04B 43/0081 | |
| 10,267,194 B2 * | 4/2019 | Hodgson | B60K 13/04 | |
| 10,267,276 B2 * | 4/2019 | Nishio | F02M 37/50 | |
| 10,280,920 B2 * | 5/2019 | Leonard | F04C 2/18 | |
| 10,352,221 B2 * | 7/2019 | Chini | H05B 1/0236 | |
| 10,371,030 B2 * | 8/2019 | Kruse | F01N 3/206 | |
| 10,436,161 B2 * | 10/2019 | Kim | F02M 37/14 | |
| 10,634,033 B2 * | 4/2020 | Bruck | F01N 3/2066 | |
| 10,677,129 B2 * | 6/2020 | Bruck | F01N 3/206 | |
| 10,677,206 B2 * | 6/2020 | Wheelwright | B01D 69/10 | |
| 10,690,096 B2 * | 6/2020 | Hayashi | F02B 37/025 | |
| 10,690,418 B2 * | 6/2020 | Chini | F28F 21/067 | |
| 10,731,613 B2 * | 8/2020 | Bykowski | B01D 29/03 | |
| 10,753,329 B2 * | 8/2020 | Hayashi | B01D 29/13 | |
| 10,767,531 B2 * | 9/2020 | Marini | F04D 13/086 | |
| 10,892,073 B2 * | 1/2021 | Chini | H01C 1/142 | |
| 10,961,953 B2 * | 3/2021 | Chini | F02M 25/025 | |
| 11,014,446 B2 * | 5/2021 | Tipton | B60K 15/077 | |
| 11,073,118 B2 * | 7/2021 | Ito | F04C 13/008 | |
| 2003/0111060 A1 * | 6/2003 | Ito | F02M 37/50 | 123/509 |
| 2004/0045884 A1 * | 3/2004 | Roth | B01D 35/18 | 210/184 |
| 2007/0029309 A1 * | 2/2007 | Keite-Telgenbuscher | C09J 9/02 | 219/549 |
| 2008/0256937 A1 * | 10/2008 | Suzuki | F01N 13/02 | 60/300 |
| 2009/0230136 A1 * | 9/2009 | Dougnier | F01N 3/2066 | 220/592.01 |
| 2010/0050606 A1 * | 3/2010 | Fulks | F01N 11/00 | 60/286 |
| 2010/0078426 A1 * | 4/2010 | Li | F01N 3/2066 | 219/600 |
| 2010/0213189 A1 * | 8/2010 | Keite-Telgenbuescher | H05B 3/845 | 219/548 |

(56) References Cited

U.S. PATENT DOCUMENTS

| | | | | |
|---|---|---|---|---|
| 2010/0236243 | A1* | 9/2010 | Lolas | F01N 11/00 60/689 |
| 2011/0002798 | A1* | 1/2011 | Ford | B60K 15/077 417/410.1 |
| 2011/0232271 | A1* | 9/2011 | Haeberer | B60K 13/04 60/295 |
| 2011/0290793 | A1* | 12/2011 | Murabayashi | F02M 37/025 220/4.14 |
| 2011/0309087 | A1* | 12/2011 | Hodgson | G01F 23/268 220/562 |
| 2012/0031083 | A1* | 2/2012 | Minami | F01N 3/0212 60/297 |
| 2012/0111870 | A1* | 5/2012 | Hodgson | G01F 23/268 220/562 |
| 2012/0118401 | A1* | 5/2012 | Murabayashi | B60K 15/077 137/123 |
| 2012/0183459 | A1* | 7/2012 | Rocheux | F01N 3/2066 423/212 |
| 2012/0311999 | A1* | 12/2012 | Hodgson | F01N 3/2066 60/295 |
| 2013/0025269 | A1* | 1/2013 | Hodgson | F01N 3/2066 60/317 |
| 2013/0098006 | A1* | 4/2013 | Brueck | F01N 3/2066 60/295 |
| 2013/0104528 | A1* | 5/2013 | Chmielewski | F16L 53/34 60/286 |
| 2013/0168308 | A1* | 7/2013 | Scagliarini | B01D 35/0273 210/416.4 |
| 2013/0219869 | A1* | 8/2013 | Brueck | F01N 3/2066 60/286 |
| 2013/0233285 | A1* | 9/2013 | Yamada | F02M 37/106 123/514 |
| 2013/0233850 | A1* | 9/2013 | Treudt | F01N 3/2066 220/4.14 |
| 2013/0255234 | A1* | 10/2013 | Bauer | F01N 13/008 60/287 |
| 2013/0263941 | A1* | 10/2013 | Landes | B01D 35/005 137/351 |
| 2014/0138368 | A1* | 5/2014 | Verstraeten | H05B 3/12 219/202 |
| 2014/0202951 | A1* | 7/2014 | Graber | B01D 35/005 210/489 |
| 2014/0238510 | A1* | 8/2014 | Henry | B60K 15/03 137/544 |
| 2015/0090724 | A1* | 4/2015 | Gross | F01N 3/2066 220/562 |
| 2015/0192051 | A1* | 7/2015 | Ogawa | F01N 3/2066 60/295 |
| 2015/0202553 | A1* | 7/2015 | Sann | F01N 3/2066 210/416.1 |
| 2015/0210159 | A1* | 7/2015 | Maguin | B60K 15/03177 60/295 |
| 2015/0285120 | A1* | 10/2015 | Hodgson | B60K 13/04 60/301 |
| 2015/0367264 | A1* | 12/2015 | Treudt | F01N 3/2066 210/184 |
| 2016/0129782 | A1* | 5/2016 | Tipton | B60K 15/077 137/550 |
| 2016/0138455 | A1* | 5/2016 | Chini | F01N 3/2066 392/447 |
| 2017/0074257 | A1* | 3/2017 | Chini | F04B 23/025 |
| 2017/0122170 | A1* | 5/2017 | Fahrenkrug | B01D 35/0276 |
| 2017/0122275 | A1* | 5/2017 | Ishimitsu | B60K 15/03 |
| 2017/0233275 | A1* | 8/2017 | Segroves | B01D 21/08 210/702 |
| 2017/0350297 | A1* | 12/2017 | Marini | F01N 3/2073 |
| 2018/0023526 | A1* | 1/2018 | Wheelwright | B01D 69/10 210/651 |
| 2018/0290539 | A1* | 10/2018 | Tipton | B60K 15/077 |
| 2018/0363525 | A1* | 12/2018 | Bruck | F01N 3/2066 |
| 2018/0371976 | A1* | 12/2018 | Bruck | F01N 3/208 |
| 2019/0107080 | A1* | 4/2019 | Heidemeyer | F02M 25/0224 |
| 2019/0107089 | A1* | 4/2019 | Bykowski | F02M 37/103 |
| 2019/0127535 | A1* | 5/2019 | Paoli | C08J 3/203 |
| 2019/0203868 | A1* | 7/2019 | Chini | F24H 1/185 |
| 2019/0323455 | A1* | 10/2019 | Chini | F02M 25/025 |
| 2019/0366836 | A1* | 12/2019 | Farina | B01D 35/027 |
| 2019/0375291 | A1* | 12/2019 | De Metri | B60K 15/077 |
| 2020/0317044 | A1* | 10/2020 | Paoli | B60K 15/03 |
| 2020/0318590 | A1* | 10/2020 | Bykowski | B01D 29/03 |
| 2021/0148274 | A1* | 5/2021 | Dalpez | F01N 3/2889 |

OTHER PUBLICATIONS

Espacenet Bibliographic data:DE 10 2014 222 467 (A1), Published May 4, 2016, 2 pgs.
Espacenet Bibliographic data:DE 10 2016 203 056 (A1), Published Aug. 31, 2017, 1 pg.
Espacenet Bibliographic data:DE 10 2016 205 103 (A1), Published Oct. 5, 2017, 1 pg.

* cited by examiner

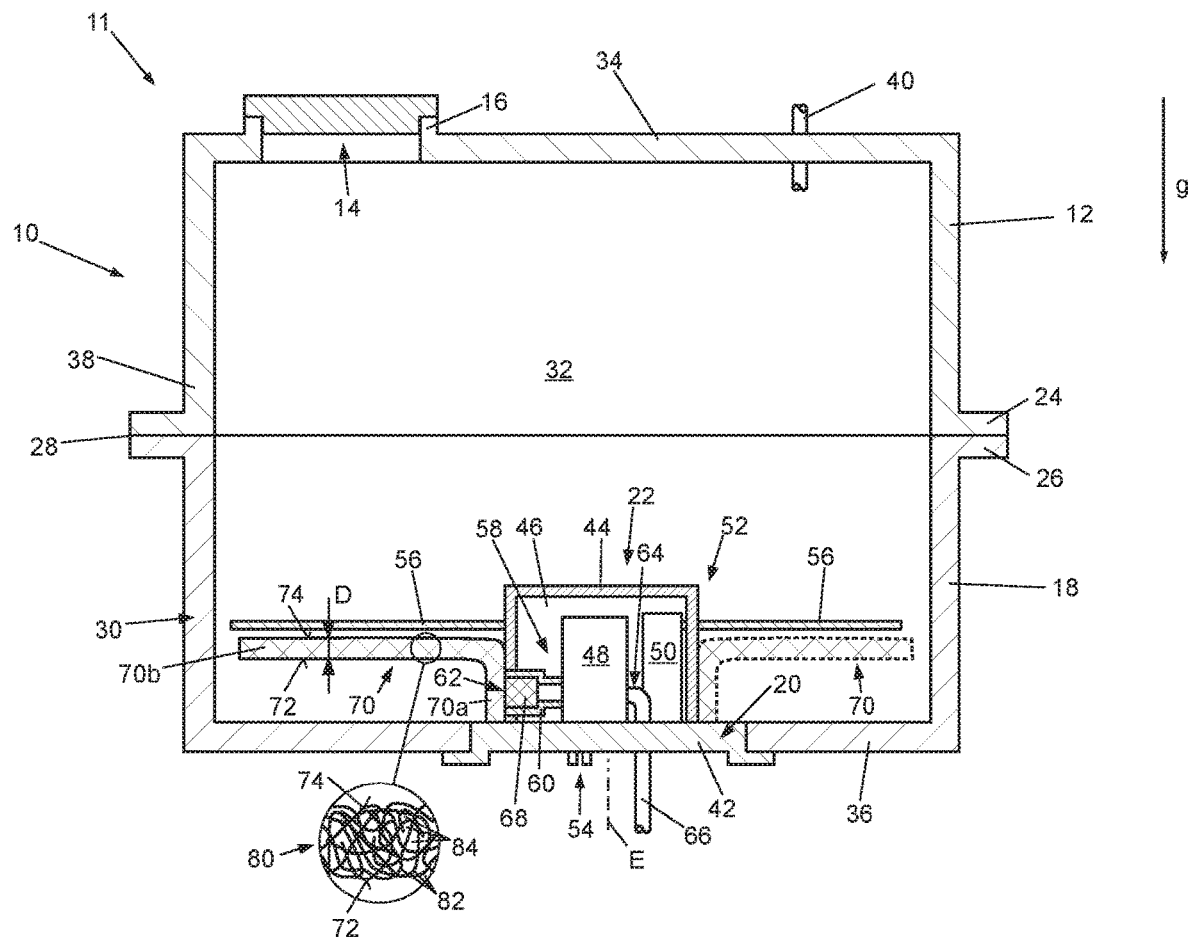

MOTOR VEHICLE TANK SUBASSEMBLY AND WITHDRAWAL MODULE HAVING A POROUS CONVEYING BODY

The present invention relates to a motor vehicle tank subassembly for storing and discharging an operating liquid, encompassing a tank having a tank volume into which operating liquid is admittable through a filling opening and from which operating liquid is withdrawable through a withdrawal opening, and further encompassing a conveying pump having an intake side and a delivery side, the intake side being connected in pressure-transferring fashion to the withdrawal opening in order to furnish at the withdrawal opening a withdrawal vacuum which is lower in pressure relative to the pressure in the tank volume; a material that forms a pore volume being received in the tank.

BACKGROUND OF THE INVENTION

A tank subassembly of the species is known from DE 38 80 271 T2. This document discloses a fuel tank that is filled with fiber structures in order to prevent surging movements of fuel in the tank and in order to prevent excessively rapid outflow of liquid from the tank, for example, in the event of damage to the tank. Surging movements of a fuel in the tank can result in electrostatic charging and thus in undesired sparking in the vicinity of the stored fuel. The fiber structures received in the known fuel tank thus provide explosion protection. The fiber structures that fill up the entire tank volume are furthermore embodied to be electrically conductive, so that any electrostatic charge occurring even in a context of limited surging movements can be discharged to the tank wall and thus to a ground potential.

Also known on motor vehicles are further operating-liquid tanks that, for example, store water in order to inject the latter into the fresh mixture in order to abate pollutants that occur upon the combustion of fuel in the internal combustion engine (see DE 10 2016 205103 A1, US 2006/0266307 A1, DE 10 2016 203056 A1, DE 10 2014 222467 A1, and WO 2017/137101 A1). In addition or alternatively to this manipulation of the fresh mixture in order to reduce pollutant emissions, it is known to inject aqueous urea solution into the exhaust gas produced upon combustion. Aqueous urea solution is stored for this purpose in tanks as an operating liquid (see DE 10 2015 210682 A1).

All the aforesaid operating liquids are withdrawn from the tank by conveying pumps during utilization of the tank subassembly as intended, and delivered to a respective user.

While there is no risk of freezing with combustible fuels because of their physical properties, the tank subassemblies for storing water or water-containing operating liquids comprise heating apparatuses in order to prevent freezing of the operating liquid or to thaw out frozen operating liquid.

The freezing of operating liquid in motor vehicles is not, however, the only risk of deficient withdrawal of operating liquid from the tank. In addition to the static withdrawal risk presented by freezing, dynamic withdrawal risks exist if, for example in the tank of the tank subassembly carried on a motor vehicle, the operating liquid which is movable therein moves away from the withdrawal opening due to accelerated motion resulting from acceleration forces, and is temporarily kept away from it. The conveying pump then cannot take in operating liquid through the withdrawal opening and deliver it to the relevant user. In a context of extended cornering or long phases of acceleration to high speed from a stop, this can result in an appreciable impairment in the supply of operating liquid to a user.

SUMMARY OF THE INVENTION

An object of the present invention is therefore to refine the motor vehicle tank subassembly recited previously in such a way that, with the greatest possible storage efficiency, it provides withdrawal of operating liquid therefrom with greater reliability compared with the existing art.

This object is achieved in accordance with the present invention by a tank subassembly of the kind recited previously in which the material that forms a pore volume, constituting a porous conveying body having a predetermined body volume, occupies only part of the tank volume, and another part of the tank volume is devoid of the porous conveying body, the porous conveying body being embodied to receive operating liquid stored in the tank in its pore volume utilizing a capillary effect. The porous conveying body comprises a discharge portion that is operatively connected to the withdrawal opening in such a way that the withdrawal vacuum furnished at the withdrawal opening brings about in pores of the discharge portion a discharge vacuum that overcomes the capillary effect occurring there. The remainder of the porous conveying body extends away from the discharge portion and away from the withdrawal opening.

Because the porous body occupies only part of the tank volume, only part of the tank volume is also occupied by the material of the porous conveying volume which furnishes the pore volume. That part of the tank volume which is devoid of the porous conveying body is available, entirely and unrestrictedly, for the reception and storage of operating liquid.

A capillary effect of a pore volume with respect to a predefined operating liquid is dependent on the one hand on physical variables that depend both on the operating liquid selected and on the pore-forming matrix material of the conveying body. The capillary effect depends on the other hand on the average pore size of the pores constituted in the conveying body. Even when the materials for the operating liquid and for the pore-forming matrix of the conveying body are already defined, it is possible, by adjusting the pore size, to configure a porous conveying body, constituted from a predetermined material, in such a way that it conveys a predefined operating liquid in its pore volume in capillary effect-induced fashion without any other external force action with the exception of the unavoidable force of gravity.

Without further measures, the porous conveying body arranged in a tank volume would merely take in operating liquid until full. But because, for example as a result of a corresponding physical arrangement with respect to one another, the discharge portion of the conveying body is operatively connected to the withdrawal opening in such a way that the withdrawal vacuum in the discharge portion overcomes the capillary effect occurring there, the conveying pump can extract operating liquid from the discharge portion via the withdrawal opening. The result is to produce in turn a concentration difference within the conveying body in terms of the filling of pores with operating liquid in different regions of the conveying body. Because of the large surface area of the conveying body matrix enclosing the pores, and the liquid friction thereby brought about, the discharge vacuum impressed on the discharge portion from the withdrawal opening does not extend deep into the conveying body. The concentration difference occurring as a result of the local withdrawal of operating liquid from the discharge portion nevertheless ensures a capillary effect-induced conveying movement of operating liquid out of regions having pores more greatly filled with operating liquid into the discharge portion having emptied or partly emptied pores.

In order to allow operating liquid to be conveyed in capillary fashion to the withdrawal opening over a sufficiently long distance within the tank volume, and thus to increase the withdrawal reliability of the tank, the remainder of the conveying body extends away both from the discharge portion and from the withdrawal opening.

Because of the capillary effect that is furnished, the porous conveying body is therefore capable of conveying operating liquid from a portion of the tank volume located at a greater distance from the withdrawal opening, to the discharge portion located closer to the withdrawal opening, even when the withdrawal opening is temporarily not surrounded by operating liquid because of dynamic effects of tank movement.

In principle, with a sufficiently large withdrawal vacuum the withdrawal opening can be arranged at a distance from a surface of the discharge portion of the conveying body and can still generate a sufficiently large discharge vacuum at least in an edge region of the discharge portion, so that operating liquid can be conveyed from the discharge portion to the withdrawal opening. A withdrawal of operating liquid which is advantageously as continuous as possible when operating liquid is being moved away from the withdrawal opening in response to acceleration can be achieved by the fact that the withdrawal opening is completely covered by the discharge portion of the porous conveying body. The withdrawal vacuum of the withdrawal opening then acts on the discharge portion directly as a discharge vacuum. Complete coverage of the withdrawal opening can be achieved very effectively by the fact that the discharge portion touches a mouth, forming the withdrawal opening, of a withdrawal conduit, preferably along its entire circumference around the withdrawal opening.

The smaller the amount of operating liquid that is present in the tank in relation to the maximum possible fill volume of operating liquid, the more easily operating liquid can be moved away from the withdrawal opening by acceleration forces, for example centrifugal force. In order to ensure continuous withdrawal of operating liquid from the tank, the latter preferably comprises a venting conduit through which gas, as a rule air, can flow back into the tank as operating liquid is withdrawn from the tank. This ensures that a minimum pressure difference always exists at the withdrawal opening between the pressure of a gas contained in the tank, which is then as a rule the ambient pressure, and the withdrawal vacuum generated by the conveying pump.

Even a small conveying body volume is sufficient for capillary effect-induced conveying of operating liquid through the pore volume of the conveying body to the discharge portion. For optimum utilization of the tank volume for the storage of operating liquid, in accordance with a refinement of the present invention provision is therefore made that the conveying body is a planar conveying body having a first outer surface and a second outer surface arranged at a distance therefrom in a thickness direction, the dimension of the conveying body in a thickness dimension being its smallest dimension. The thickness of the conveying body is preferably selected so that when the conveying body covers the withdrawal opening with one of its outer surfaces, the effect of the withdrawal vacuum on the oppositely located outer surface located remotely from the withdrawal opening no longer overcomes the capillary effect of the conveying body with respect to the operating liquid. The conveying body is preferably no thicker than 20 mm, particularly preferably no thicker than 12 mm. Preferably the first and the second outer surface are parallel to one another; it is not be excluded that the conveying body is locally stiffened by embossing and/or ribbing of one or both outer surfaces. In order for the smallest possible proportion of the tank volume to be occupied by the preferably planar conveying body, preferably more than 70% of the surfaces of the first and the second outer surface are arranged parallel to one another. The outer surfaces can be entirely or partly flat, or can at least locally be curved around at least one axis of curvature.

For high storage efficiency with regard to the operating liquid, the conveying body occupies no more than 30%, preferably no more than 15%, of the tank volume, the pore volume of the conveying body being part of the conveying body.

In principle, the tank is preferably embodied in such a way that it comprises a tank floor, a tank ceiling located at a distance oppositely from the tank floor, and a tank side wall connecting the tank floor and tank ceiling.

Because conveyance of operating liquid from a region close to the tank ceiling is unproblematic because of the high fill level of the tank which as a rule then exists, but because acceleration forces move the operating liquid toward a side wall portion of the tank when the fill level is low, the conveying body extends away from the conveying opening preferably to a portion of the tank side wall located remotely from the withdrawal opening. The conveying body can extend away from the withdrawal opening in multi-arm fashion, toward several different tank side wall portions that are located remotely from one another and preferably enclose an angle between one another.

In order to ensure conveyance of operating liquid toward the withdrawal opening even in a context of large-magnitude acceleration forces, a longitudinal end of the conveying body located remotely from the withdrawal opening is preferably located closer to the portion of the tank side wall than to the withdrawal opening. Optionally, the conveying body extends as far as the tank side wall and touches it.

Because withdrawal reliability is increasingly jeopardized by acceleration forces as the tank becomes emptied, in order to ensure liquid withdrawal even with a predominantly emptied tank preferably at least a longitudinal end of the conveying body which is located remotely from the withdrawal opening is located closer to the tank floor than to the tank ceiling. For the reasons recited, the distance of the longitudinal end of the conveying body from the tank ceiling is preferably more than twice, particularly preferably more than four times, its distance from the tank floor. To ensure that the capillary forces acting in the conveying body do not work unnecessarily against gravity, in accordance with a refinement of the present invention the entire conveying body is located in the aforementioned vertical portion of the tank volume which is closer to the tank floor.

In order to allow assurance that the conveying body can convey operating liquid over its entire extent, the average pore size fluctuates over the entire conveying body by no more than 15%, preferably by no more than 10%, with reference to the smallest value that occurs.

In order to furnish its pore volume, the conveying body can encompass as a porous material a fiber web, in particular a binder-free fiber web, for example a nonwoven fabric or a felt, or a bound fiber web, for example a LWRT, and/or a fiber mesh and/or a fiber fabric and/or an open-cell foam. In all the materials recited, the average pore size is adjustable in the context of manufacture. A nonwoven fabric or a felt can be densified and compacted by needling. LWRT, constituting a dimensionally stable material, can acquire a desired average pore size by partial compacting.

The withdrawal opening can be configured in one of the aforesaid tank walls (tank side wall and/or tank floor), the tank floor being preferred because in the completely installed state it is at the geodetically lowest point of the tank, which is wetted for the longest time by operating liquid during intentional emptying of the tank.

The withdrawal opening can be embodied at the end of a withdrawal conduit, so that the conveying pump can be provided at a site advantageous for the placement thereof but so that withdrawal of the operating liquid can nevertheless occur at a different site particularly suitable therefor. The withdrawal conduit can be configured locally or entirely in a housing, for example constituting a channel portion extending in a housing wall and/or a in housing floor. A housing of this kind can be a tank shell enclosing the tank volume or a housing of a preassembled withdrawal module that comprises at least the conveying pump in order to ensure the withdrawal function.

In order to protect the conveying pump from the influence of undesired particles in the operating liquid, there can be provided between the conveying pump and the withdrawal opening a conveying conduit in which a filter is provided in order to purify the operating liquid conveyed in the conveying conduit. One such conveying conduit is the aforementioned withdrawal conduit.

In order to be able to furnish the largest possible installation volume for the filter, the filter is preferably provided in the region of the withdrawal opening. The filter is then replaceable without great effort, for example if correspondingly contaminated after a certain operating time. As a rule, the filter is also a porous body like the conveying body, the average pore size of the filter preferably being smaller than that of the conveying body. In terms of conveying technology, the conveying body and the filter advantageously form one continuously contiguous porous volume through which operating liquid is conveyed on the intake side of the conveying pump to said pump. The filter and the discharge portion of the conveying body are therefore preferably arranged in abutting engagement against one another. The discharge portion of the conveying body can then furthermore serve as a kind of pre-filter for the filter of the conveying conduit; this can have a positive effect on the operating service life of the filter.

In order to allow operating liquid to be withdrawn from the tank even at low temperatures, in accordance with an advantageous refinement of the present invention the tank subassembly comprises a heating apparatus. The latter is preferably arranged in the tank volume so that heat can be discharged directly to the operating liquid. In order to allow the capillary conveying effect of the conveying body to be maintained even at low temperatures, the heating apparatus and conveying body preferably proceed parallel to one another at least locally. As a result of the displacement effect of acceleration forces which increases with increasing emptying of the tank, a portion of the conveying body which proceeds away from the discharge portion is particularly preferably arranged between the tank floor and a heat discharge portion of the heating apparatus. As a result, a portion of the conveying body not only can be arranged particularly close to the tank floor but also can be heated.

In order to equip, and in particular to retrofit, a plurality of physically differently configured tanks with the capillary-conveying conveying body, it is advantageous if the tank comprises a tank shell that surrounds the tank volume and has an installation opening as well as a preinstalled withdrawal module, the withdrawal module comprising: a module base attachable to the tank shell in the region of the installation opening; the withdrawal opening; and, retained on the module base, at least the conveying pump. The withdrawal module preferably also comprises the conveying body. The withdrawal module can thus be manufactured irrespective of the tank in or on which it will later be placed, and can be installed on any tank shell that is nevertheless configured to be large enough to receive the withdrawal module. The module base preferably covers the installation opening completely when the withdrawal module is installed in operationally ready fashion on the tank shell.

The object recited above is therefore advantageously also achieved by a withdrawal module for withdrawing operating liquid from a tank volume, encompassing: a module base embodied for attachment to a tank shell; a conveying pump, retained on the module base, having an intake side and a delivery side; a withdrawal conduit that is connected in pressure-transferring fashion to the intake side of the conveying pump and comprises at its end portion, located remotely from the conveying pump, a withdrawal opening; and a porous conveying body that covers the withdrawal opening and extends away from the withdrawal opening. The statements made above regarding the conveying body of the tank subassembly apply to the conveying body of the withdrawal module.

The module base can be a carrying plate that carries the conveying pump and, if applicable, further functional units, for example the heating apparatus already recited above; a fill level sensor; a quality sensor for detecting a quality state, for example purity, of the operating liquid received in the tank; and the like.

The module base can encompass a housing that can in turn comprise the aforementioned withdrawal opening.

The present invention furthermore relates to a use of a tank, as described and refined above, to store water or aqueous urea solution in a motor vehicle. The present invention furthermore relates to a use of a porous conveying body, having a smaller body volume compared with the tank volume, for capillary effect-induced conveyance of operating liquid, in particular of aqueous operating liquid, from a site located remotely from a withdrawal opening to a withdrawal opening furnishing a withdrawal vacuum in an operating-liquid tank, and for the discharge of operating liquid to the withdrawal opening.

The object recited previously is also achieved by a motor vehicle having a tank subassembly constituted as described above.

These and other objects, aspects, features and advantages of the invention will become apparent to those skilled in the art upon a reading of the Detailed Description of the invention set forth below taken together with the drawing which will be described in the next section.

BRIEF DESCRIPTION OF THE DRAWING

The invention may take physical form in certain parts and arrangement of parts, a preferred embodiment of which will be described in detail and illustrated in the accompanying drawing which form a part hereof and wherein:

FIG. 1 is a schematic longitudinal section view through an embodiment according to the present invention of a motor vehicle tank subassembly.

DESCRIPTION OF PREFERRED EMBODIMENTS

Referring now to the drawing wherein the showings are for the purpose of illustrating preferred and alternative embodiments of the invention only and not for the purpose of limiting the same, in FIG. 1, a liquid tank of a motor vehicle tank subassembly 11 according to the present invention is labeled in general with the number 10. Liquid tank 10 preferably encompasses an upper shell part 12 that comprises a filling opening 14 having a flange rim 16 surrounding filling opening 14. A filling conduit, for example a filler tube (not depicted in FIG. 1), can be attached to flange rim 16. Filling opening 14, or the filling conduit if present, can preferably be closed off by a cover 17.

Liquid tank 10 furthermore encompasses a lower shell part 18 that comprises an installation opening 20 having a withdrawal module 22 that is inserted into installation opening 20 and closes it off.

Upper shell part 12 and lower shell part 18 are joined to one another, for example adhesively bonded or welded, preferably along respective surrounding joining flanges 24, 26. Joining flanges 24 and 26 touch one another along a joining surface 28 that is preferably flat.

Tank 10 comprises a tank shell 30 that surrounds a tank volume 32 of tank 10. Tank shell 30 encompasses a tank ceiling 34, a tank floor 36 located oppositely from tank ceiling 34, and a surrounding tank side wall 38 connecting tank ceiling 34 and tank floor 36.

Tank shell 30 can of course, discrepantly from the example depicted, comprise more than two shell parts 12 and 18, or can also be formed as a single part, for example by blow molding.

Lower shell part 18, like upper shell part 12, is preferably manufactured by injection molding.

By means of a vent conduit 40 passing through tank ceiling 34, gas present in tank 10 can flow out as operating liquid is introduced thereinto, and gas can flow in as operating liquid is withdrawn from tank 10. Gas that is unavoidably contained in tank 10, in particular air, is therefore at approximately ambient pressure.

Arrow g indicates the orientation of tank 10, in the state installed in a motor vehicle, with reference to the direction of gravity. As a result of this orientation, in the absence of external forces (with the exception of gravity), operating liquid will collect on tank floor 36.

The withdrawal of operating liquid from tank 10 is accomplished through the aforementioned withdrawal module 22. It comprises a carrying plate or installation plate 42 as a module base. A hood-shaped housing 44 is arranged on installation plate 42. Installation plate 42 is inserted into installation opening 20 and connected to tank floor 36, for example by adhesive bonding or plastic welding. Installation plate 42 is thus connected in liquid-tight fashion to installation opening 20.

A conveying pump 48 and an input part 50 of a heating apparatus 52 are received in receiving space 46 constituted between installation plate 42 and the hood-shaped housing 44. Both conveying pump 48 and heating apparatus 52 are electrically operated functional units, and for that reason withdrawal module 22 can be supplied with electrical energy from the outer side of the tank through an electrical connector configuration 54.

Heating apparatus 52 comprises a planar heat discharge component 56, for example a resistance heating trace arranged between two protective films.

On intake side 58 of conveying pump 48, a withdrawal conduit 60 leads to housing 44. Withdrawal conduit 60 terminates there in a withdrawal opening 62. Through the latter, conveying pump 48 takes in operating liquid from tank volume 32 and conveys it on its delivery side 64, via a conveying conduit 66, to a user (not depicted). One such user can be an injection nozzle for water or for aqueous urea solution.

A filter component 68 is replaceably arranged in the region of withdrawal opening 62 in order to purify operating liquid taken in by conveying pump 48.

In order to enhance the reliability of operating liquid withdrawal from tank 10 by means of conveying pump 48, a porous conveying body 70 is provided in tank volume 32, in the example depicted connected fixedly to housing 44 of withdrawal module 22.

A magnified detail at the bottom left of FIG. 1 shows, schematically and in enlarged fashion, an example of the structure of the material of conveying body 70. A fiber web material 80, having fibers 82 as a matrix material of conveying body 70, forms pores 84 in the interstices existing between fibers 80.

Conveying body 70 is advantageously embodied on one piece from a planar nonwoven fabric that is arranged in angled fashion in tank 10. A discharge portion 70a that is located closest to withdrawal opening 62, and that touches both filter component 80 and the mouth of withdrawal conduit 60 so as to form a contiguous porous arrangement of conveying body 70 and filter component 80, completely covers withdrawal opening 62 constituted at the mouth of withdrawal conduit 60. Withdrawal vacuum generated by conveying pump 48 thus acts directly on discharge portion 70a via withdrawal conduit 60 and withdrawal opening 62.

The porosity, i.e. the average pore size, of conveying body 70 is substantially the same, or fluctuates by no more than 15%, over its entire extent.

The average pore size is selected in such a way that conveying body 70 conveys operating liquid in tank 10 into the interior of conveying body 70 utilizing a capillary effect. After tank 10 is filled, conveying body 70 that is immersed in operating liquid therefore fills itself up until its pore volume is filled with operating liquid.

Because withdrawal opening 62 is covered by discharge portion 70a, the withdrawal vacuum furnished by conveying pump 48 at withdrawal opening 62 acts, possibly diminished by friction effects, as a discharge vacuum into the pore volume of discharge portion 70a. The withdrawal vacuum furnished by conveying pump 48 is selected in such a way that the discharge vacuum acting in the pore volume of discharge portion 70a in the region of withdrawal opening 62 overcomes the capillary effect of the pores of conveying body 70. As a consequence, conveying pump 48 can convey operating liquid out of discharge portion 70a.

When operating liquid is withdrawn from conveying body 70 in discharge portion 70a, that liquid then flows by itself, as a result of capillary action, out of those regions of conveying body 70 which are located farther from withdrawal opening 62 into discharge portion 70a, when the discharge vacuum no longer has any effect at all due to friction effects at the large surface area in the interior of conveying body 70.

Conveying pump 48 can consequently withdraw operating liquid continuously from tank 10 as long as any portion of conveying body 70 is in contact with the operating liquid.

If the operating liquid becomes moved away from the comparatively central location of withdrawal opening 62 in tank volume 32 toward tank side wall 38, for example to the left in FIG. 1, as a result of centrifugal force, conveying pump 48 can still withdraw operating liquid from tank 10 because a conveying limb 70b of conveying body 70, adjoining discharge portion 70a, extends away from withdrawal opening 62 toward side wall 38.

Because the effect of taking operating liquid away from withdrawal opening 62 as a result of centrifugal force, or acceleration forces in general, becomes greater with increasing emptying of tank 10, at least conveying limb 70b is arranged as close as possible to tank floor 36, for example in the region of the lowest 20% of the inside tank height in the region where it is arranged, and extends close to tank side wall 38, optionally touches it, or is at least located closer to it than to withdrawal opening 62.

Conveying limb 70b preferably extends parallel to the planar heat-discharging component 56, particularly preferably between the latter and tank floor 36, so that operating liquid in a liquid aggregate state can be withdrawn from tank 10 even if temperatures that might result in freezing of the operating liquid in tank 10 exist outside tank 10.

Conveying body 70 is embodied as a planar conveying body 70 having outer surfaces 72 and 74 that are for the most part parallel to one another and are arranged at a distance from one another in a thickness direction D of conveying body 70.

As indicated with dashed lines in the right half of FIG. 1, conveying body 70 can surround housing 44 partly, for example over more than 180° and less than 290°, or also completely. Congruently with the angular extent of conveying body 70 around housing 44, withdrawal opening 62 can extend over an angular range of more than 180° around an introduction axis E which passes centrally and orthogonally through installation opening 20 and along which withdrawal module 22 is introduced into the withdrawal opening. In order to stabilize housing 44, a withdrawal opening 62 that is long in a circumferential direction about the introduction axis E can be embodied to be interrupted, optionally several times.

The reliability of withdrawal from motor vehicle tank subassembly 11 is therefore appreciably increased as compared with comparable tank subassemblies of the existing art not having a porous conveying body 70.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A motor vehicle tank subassembly for storing and discharging an operating liquid, comprising:
   a tank defining a tank volume;
   a filling opening for introducing an operating liquid into the tank volume;
   a withdrawal opening from which any operating liquid can be withdrawn;
   a hood shaped housing within the tank;
   a conveying pump within the hood-shaped housing, having an intake side and a delivery side, the intake side being connected in pressure-transferring fashion to the withdrawal opening in order to furnish at the withdrawal opening a withdrawal vacuum which is lower in pressure relative to the pressure in the tank volume;
   a porous planar conveying body including a material defining a pore volume being received in the tank, wherein the porous planar conveying body occupies only part of the tank volume, and another part of the tank volume is devoid of the porous conveying body, the planar porous conveying body being operable to transport any operating liquid stored in the tank in its pore volume via a capillary effect, the planar porous conveying body comprising a discharge portion that is operatively connected to the withdrawal opening in such a way that the withdrawal vacuum furnished at the withdrawal opening brings about in pores of the discharge portion a discharge vacuum that overcomes the capillary effect occurring there; and
   a heating system including an electrically operated planar heat discharge component.

2. The motor vehicle tank subassembly according to claim 1, wherein the withdrawal opening is completely covered by the discharge portion of the porous planar conveying body.

3. The motor vehicle tank subassembly according to claim 1, wherein the porous planar conveying body is a flat conveying body having a first outer surface and a second outer surface arranged at a distance therefrom in a thickness direction, a dimension of the conveying body in the thickness direction being its smallest dimension.

4. The motor vehicle tank subassembly according to claim 3, wherein, more than 70% of the surfaces of the first and the second outer surface being arranged parallel to one another.

5. The motor vehicle tank subassembly according to claim 1, wherein the tank comprises a tank floor, a tank ceiling located at a distance oppositely from the tank floor, and a tank side wall at least partially connecting the tank floor and the tank ceiling, the porous planar conveying body extending away from the conveying opening to a portion of the tank side wall located remotely from the withdrawal opening.

6. The motor vehicle tank subassembly according to claim 5, wherein a longitudinal end of the porous planar conveying body located remotely from the withdrawal opening is located closer to the portion of the tank side wall than to the withdrawal opening.

7. The motor vehicle tank subassembly according to claim 6, wherein the longitudinal end of the porous planar conveying body touches the tank side wall.

8. The motor vehicle tank subassembly according to claim 1, wherein the tank comprises a tank floor, a tank ceiling located at a distance oppositely from the tank floor, and a tank side wall at least partially connecting the tank floor and the tank ceiling, and at least one longitudinal end of the conveying body located remotely from the withdrawal opening is located closer to the tank floor than to the tank ceiling.

9. The motor vehicle tank subassembly according to claim 8, wherein a ceiling distance of the longitudinal end of the porous planar conveying body from the tank ceiling is more than twice a floor distance of the longitudinal end of the conveying body from the tank floor.

10. The motor vehicle tank subassembly according to claim 8, wherein a ceiling distance of the longitudinal end of the porous planar conveying body from the tank ceiling is more than four times a floor distance of the longitudinal end of the porous planar conveying body from the tank floor.

11. The motor vehicle tank subassembly according to claim 1, wherein the average pore size fluctuates over the entire porous planar conveying body by no more than 15% with reference to a smallest pore size value that occurs.

12. The motor vehicle tank subassembly according to claim 1, wherein the average pore size fluctuates over the entire porous planar conveying body by no more than 10%, with reference to a smallest pore size value that occurs.

13. The motor vehicle tank subassembly according to claim 1, wherein the porous planar conveying body comprises a porous material a fiber web.

14. The motor vehicle tank subassembly according to claim 13, wherein the fiber web includes at least one of a binder-free fiber web, a nonwoven fabric, a nonwoven felt, a bound fiber web, a LWRT, a fiber mesh, a fiber fabric and an open-cell foam.

15. The motor vehicle tank subassembly according to claim 1, wherein there is provided between the conveying pump and the withdrawal opening a conveying conduit in which a filter is provided in order to purify the operating liquid conveyed in the conveying conduit.

16. The motor vehicle tank subassembly according to claim 15, wherein the filter is provided at the withdrawal opening, the filter and the discharge portion of the porous planar conveying body being arranged in abutting engagement against one another.

17. The motor vehicle tank subassembly according to claim 1, wherein at least a section of the heat discharge component and at least a section of the porous planar conveying body are flat and extend parallel to one another.

18. The motor vehicle tank subassembly according to claim 1, wherein a portion of the porous planar conveying body extends away from the discharge portion and is arranged between a tank floor and the heat discharge component.

19. The motor vehicle tank subassembly according to claim 1, wherein the tank includes an installation opening and a withdrawal module, the withdrawal module including a module base attachable to the tank in the region of the installation opening, the withdrawal opening, and the conveying pump.

20. The motor vehicle tank subassembly according to claim 1, is capable of storing at least one of water and aqueous urea solution in a motor vehicle.

* * * * *